United States Patent
Matteucci et al.

(10) Patent No.: US 9,250,151 B2
(45) Date of Patent: Feb. 2, 2016

(54) BALANCING MACHINE FOR BALANCING VEHICLE WHEELS

(75) Inventors: Marco Matteucci, Rio Saliceto (IT); Alessandro Gilocchi, Correggio (IT); Marco Montanari, Campegine (IT)

(73) Assignee: SICAM S.R.L., Correggio (RE) (IT)

( * ) Notice: Subject to any disclaimer, the term of this patent is extended or adjusted under 35 U.S.C. 154(b) by 277 days.

(21) Appl. No.: 14/115,148

(22) PCT Filed: May 16, 2012

(86) PCT No.: PCT/IB2012/000956
§ 371 (c)(1),
(2), (4) Date: Nov. 1, 2013

(87) PCT Pub. No.: WO2012/160427
PCT Pub. Date: Nov. 29, 2012

(65) Prior Publication Data
US 2014/0060182 A1    Mar. 6, 2014

(30) Foreign Application Priority Data
May 26, 2011    (IT) .............................. MO2011A0136

(51) Int. Cl.
*G01M 1/16* (2006.01)
*G01M 1/22* (2006.01)
*G01M 1/04* (2006.01)

(52) U.S. Cl.
CPC .............. *G01M 1/225* (2013.01); *G01M 1/045* (2013.01)

(58) Field of Classification Search
CPC ....... G01M 1/225; G01M 1/045; G01M 1/00; G01M 1/04; G01M 1/02; G01M 1/06; G01M 1/22; G01M 1/30; G01M 1/32; G01M 1/326
See application file for complete search history.

(56) References Cited

U.S. PATENT DOCUMENTS

| 3,589,182 A | 6/1971 | Burgett |
| 3,824,862 A * | 7/1974 | Branick .................. G01M 1/02 73/480 |

(Continued)

FOREIGN PATENT DOCUMENTS

WO    2008/138937 A2    11/2008

OTHER PUBLICATIONS

International Search Report, dated Aug. 27, 2012, from corresponding PCT application.

*Primary Examiner* — Laura Martin
*Assistant Examiner* — Samir M Shah
(74) *Attorney, Agent, or Firm* — Young & Thompson

(57) ABSTRACT

Machine for balancing vehicle wheels includes:
  a base frame supporting elements for gripping and rotating a wheel around a balancing axis;
  first sensor elements associated with the gripping and rotation elements for detecting the unbalance of the wheel;
  an electronic processing and control unit associated with the first sensor elements for calculating a balancing weight to apply onto the wheel; and
  an auxiliary detection appliance associated with the base frame and having:
    a rolling device for pressing onto the wheel, and in turn including:
      a support structure for two rollers revolving around axes parallel to each other; and
      a flexible member closed on itself in a loop, wrapped around the rollers and having a substantially flat active section, and a return section substantially opposite the active section; and
    second sensor elements associated with the rolling device for detecting the behaviour of the wheel when pressed by the rolling device.

20 Claims, 6 Drawing Sheets

(56) References Cited

U.S. PATENT DOCUMENTS

| | | | | |
|---|---|---|---|---|
| 3,922,922 A | * | 12/1975 | Goebel | G01M 1/045 73/459 |
| 3,977,243 A | | 8/1976 | Yamada et al. | |
| 4,238,954 A | * | 12/1980 | Langer | G01M 17/022 73/146 |
| 4,741,211 A | * | 5/1988 | Borner | G01M 1/28 73/462 |
| 4,998,436 A | * | 3/1991 | Kaizu | G01M 17/022 73/116.07 |
| 5,209,116 A | * | 5/1993 | Okumura | G01M 1/22 73/462 |
| 5,385,045 A | * | 1/1995 | Mannen | B60C 25/00 73/462 |
| 5,419,193 A | * | 5/1995 | Borner | G01M 1/045 73/462 |
| 5,739,427 A | * | 4/1998 | Yamaya | G01M 17/0072 73/115.07 |
| 6,069,966 A | * | 5/2000 | Jones | G01B 11/22 382/100 |
| 6,336,364 B1 | * | 1/2002 | Parker | B65B 67/12 73/462 |
| 6,439,049 B2 | * | 8/2002 | Colarelli, III | G01M 17/022 73/460 |
| 6,581,463 B1 | | 6/2003 | Colarelli, III et al. | |
| D570,888 S | * | 6/2008 | Altnether | G01M 17/022 D15/199 |
| 8,220,327 B2 | * | 7/2012 | Andersen | G01M 1/08 73/487 |
| 8,276,447 B2 | * | 10/2012 | Montanari | G01M 1/02 73/462 |
| 8,356,516 B2 | * | 1/2013 | Montanari | G01M 1/02 73/462 |
| 2001/0032499 A1 | * | 10/2001 | Jenniges | G01M 17/022 73/146 |
| 2004/0083810 A1 | | 5/2004 | Racine | |
| 2008/0017157 A1 | * | 1/2008 | Masuda | F16F 15/126 123/192.2 |
| 2010/0199760 A1 | * | 8/2010 | Seitz | G01M 17/022 73/460 |
| 2011/0048649 A1 | * | 3/2011 | Komatsu | B23P 19/069 157/1.35 |

\* cited by examiner

BALANCING MACHINE FOR BALANCING VEHICLE WHEELS

TECHNICAL FIELD

The present invention relates to a balancing machine for balancing vehicle wheels.

BACKGROUND ART

It is known that the wheels of vehicles circulating on roads require frequent balancing operations, consisting in the application to the rim of the wheel of small balancing weights, made of lead or other material, suitable for offsetting the irregular distribution of the weights in the tyre.

To perform this operation, balancing machines are commonly used having a so-called "balancing" horizontal revolving spindle, on which the wheel to be balanced must be positioned integral by means of one or more centring and fastening parts.

The amount of wheel unbalance is determined once the wheel has been made to rotate on the balancing spindle by means of a series of electronic or electromechanical devices, such as force transducers applied along the balancing spindle.

To the measurement of the unbalance must be generally added other characteristic measurements, such as the measurement of the roundness of the wheel, of the eccentricity of the wheel, of the level of wear of the tread or the like.

For this purpose, the use is known of auxiliary detection methods and appliance which allow assessing and measuring all the parameters, different from unbalance, caused by non-uniform weight distributions of the tyre/rim assembly, which can affect the correct rolling of the wheel when mounted on the vehicle being driven on the road.

It is in fact underlined that a banal lack of geometric uniformity of the rim, called lateral or radial run-out, can produce a corresponding lack of geometric uniformity on the tyre and, consequently, the wheel will jump during road rolling even though, by means of the balancing machine, its balancing has been correctly performed.

Furthermore, it should not be forgotten that any build-up of weight inside the tyre can also create lack of uniformity on the tyre structure and, therefore, lack of uniformity of the elastic constant of the tyre, which negatively affects the correct rolling, of the wheel on the road.

Such condition can be detected by means of an indirect method based on the determination of the unbalance of the tyre only due to the above weight build-up after deducting any unbalance attributable to the rim.

This method allows determining any geometric faults on the rim and any weight build-up localised faults on the tyre structure, with, if necessary the two effects being offset by means of a matching operation, wherein the rim fault is placed in geometric opposition with respect to the weight fault of the tyre so as to offset the two effects.

This indirect method, nevertheless, is rather complicated and hard to implement. As an alternative to the indirect method, the use is known of auxiliary appliance fitted on balancing machines wherein an idle roller is placed in contact with the wheel with a constant load and the assessment of the lack of uniformity is made by analysing the movement which the roller performs in the presence of the lack of uniformity itself.

A piece of equipment made this way is shown, e.g., in patent document U.S. Pat. No. 6,581,463.

In such piece of equipment the geometric faults of the wheel and any tyre weight build-ups determine the lack of uniformity of the elastic constant of the elastic system of the wheel, in a radial and/or lateral direction, which consequently cause vibrations, or movements in a radial and/or lateral direction which discharge onto the roller.

Such a situation produces in the auxiliary appliance forces in a radial or lateral direction which can be read by suitable sensors.

In other words, we are able to assess the rigidity, or better the rigid nature, of the tyre structure according to the correlation between the quantity of the applied load and the amount of movement of the roller or of the forces which discharge onto it.

This auxiliary appliance of known type is not without drawbacks.

Once combined in fact with a conventional balancing system and in combination with mechanical or no-contact devices for detecting the lateral/radial run-out of the rim and of the tyre, it allows assessing or predicting the behaviour of the wheel on the road once this finds itself operating in real load and speed conditions but, nevertheless, with a rather high degree of approximation.

The application of a rotating roller on the tyre, in fact, does not allow accurately simulating the future rolling of the wheel on the road and this approximation depends on the radius of the roller or, more in detail, on the ratio between the roller radius and wheel radius.

In the appliances of known type, furthermore, the reading of the radial run-out and of the lateral run-out is not always an easy operation, taking into account the fact that the lack of geometric and weight uniformity of the rim/tyre assembly usually produces both a radial component and a lateral component and the measurement of one can affect the accuracy of the measurement of the other.

DESCRIPTION OF THE INVENTION

The main aim of the present invention is to provide a balancing machine for balancing vehicle wheels which allows to overcome the problem of creating a real simulation of the road during measurements.

Another object of the present invention is to provide a practical, easy and functional solution in which the wheel can be tested under load in a real road simulator where it is possible to detect the variation of radial force and the variation of lateral force in an easy and practical way.

Another object of the present invention is to provide a balancing machine for balancing vehicle wheels which allows to overcome the mentioned drawbacks of the state of the art within the ambit of a simple, rational, easy and effective to use as well as low cost solution.

The above objects are achieved by the present balancing machine for balancing vehicle wheels, comprising:
- a base frame supporting gripping and rotation means for gripping and rotating a wheel for vehicles around a balancing axis,
- first sensor means associated with said gripping and rotation means suitable for detecting the unbalance of said wheel,
- at least an electronic processing and control unit associated with said first sensor means for the calculation of at least a balancing weight to apply onto said wheel to balance said unbalance, and
- at least an auxiliary detection appliance associated with said base frame and having:
  - at least a rolling device suitable for pressing onto said wheel, and second sensor means associated with said rolling device and suitable for detecting the behaviour of said wheel when pressed by said rolling device, characterized by the fact that said rolling device comprises:

a support structure for at least two rollers revolving around axes parallel to each other, and at least a flexible member closed on itself in a loop, wrapped around said rollers and having a substantially flat active section, suitable for pressing on said wheel to simulate the rolling thereof on road, and a return section substantially opposite said active section.

BRIEF DESCRIPTION OF THE DRAWINGS

Other characteristics and advantages of the present invention will become more evident from the description of a preferred, but not sole, embodiment of a balancing machine for balancing vehicle wheels, illustrated purely as an example but not limited to the annexed drawings in which.

FIGS. from 7 to 9 illustrate, in a series of lateral views, the operation of the machine according to the invention.

EMBODIMENTS OF THE INVENTION

With particular reference to such figures, globally indicated by 1 is a balancing machine for balancing vehicle wheels.

The machine 1 comprises a base frame 2 supporting gripping and rotation means 3 for gripping and rotating of a wheel R for vehicles around a balancing axis A.

The balancing axis A, in particular, is horizontal and is defined by a rotating spindle which protrudes and overhangs from the base frame 2 and on which the wheel R to be balanced can be fitted coaxially.

The gripping and rotation means 3 are motor-driven to drive the rotating spindle A and the wheel R in rotation and are associated with the first sensor means 4 suitable for detecting the unbalance of the wheel R.

Figure 1:
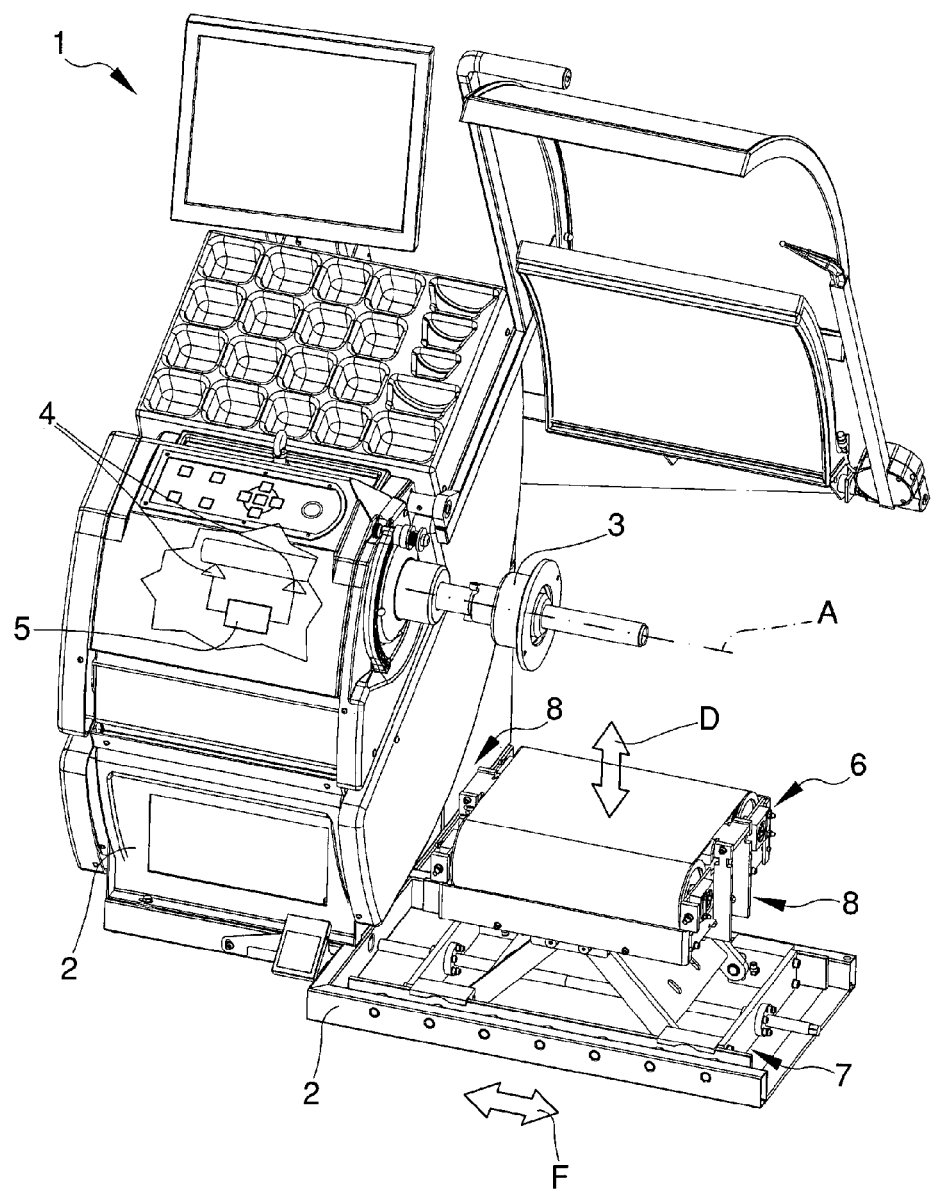
FIG. 1 is an axonometric view of the machine according to the invention.

The first sensor means 4 are schematically shown in FIG. 1 and, e.g., consist in traditional piezoelectric sensors, load cells or the like, positioned between the base frame 2 and the rotating supports of the rotating spindle A.

The first sensor means 4 are electronically connected to an electronic processing and control unit 5 suitable for calculating at least a balancing weight to be fitted to the rim of the wheel R to balance its unbalance as read by the first sensor means 4.

The calculation by the electronic processing and control unit 5 is such as to define both the quantity of the weight of the balancing weight to be fitted and its position on the rim of the wheel R.

The machine 1 also comprises an auxiliary detection appliance 6, 7, 8 associated with the base frame 2.

The auxiliary detection appliance 6, 7, 8 comprises a rolling device 6, i.e., a device which is suitable for pressing on the wheel R and is designed to roll together with this, as will be better described below.

The rolling device 6 comprises:

a support structure 9, 10, which supports at least two rollers 11 rotatable around axes parallel the one with the other and not at right angles to the balancing axis A; and a flexible member 12 closed on itself in a loop, wrapped around the rollers 11 and having a substantially flat active section 12a, suitable for pressing on the wheel to simulate the rolling thereof on the road, and a return section 12b substantially opposite the active section 12a.

More in detail, the support structure 9, 10 has a substantially box shape and has a bottom wall 9 and a series of side walls 10, two of which have a series of supporting bearings 13 for the rotation of the rollers 11.

The flexible member 12 is belt-shaped; the portion of the belt 12 which extends between the rollers 11 and faces the balancing axis A defines the active section 12a while the portion of the belt 12 which extends between the rollers 11 and is arranged on the opposite side defines the return section 12b.

Usefully, the width of the belt 12, i.e. its extension in a direction parallel to the rotation axes of the rollers 11, is substantially bigger than the width of the tread of the wheel R.

This last statement means that the width of the belt 12 is sized so as to allow the belt 12 to press on the wheel R resting on the entire cross extension of the tread, whatever the dimensions of the wheel R to be tested.

This also implies that the width of the belt 12 is established in such a way as to allow the above use with all the wheels R available on the market, or at least with those for which the machine 1 is designed to work.

The width of the belt 12, e.g., is 41 cm.

The rolling device 6 also comprises a substantially flat contrast element 14, which is associated with the support structure 9, 10 in correspondence to the active section 12a and on which the active section 12a is arranged in sliding contact on the opposite side with respect to the wheel R.

In other words, the contrast element 14 is positioned in the space between the active section 12a and the return section 12b and in contact with the active section 12a; this way, during use, the active section 12a is placed against the wheel R, rolling while it slides on the contrast element 14.

Figure 2:
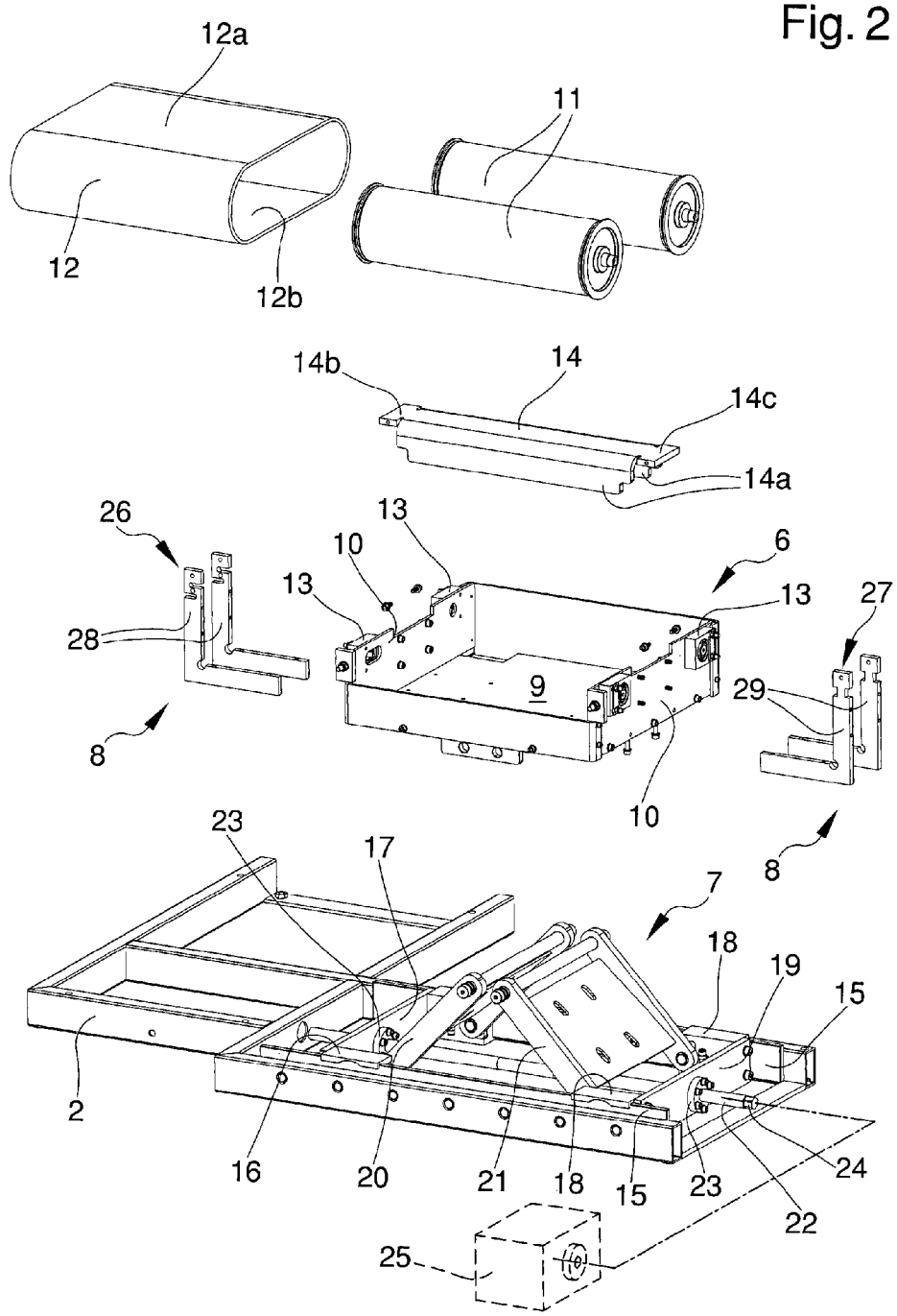
FIG. 2 is an axonometric, partially exploded view of the auxiliary detection appliance provided by the machine according to the invention.
Figure 3:
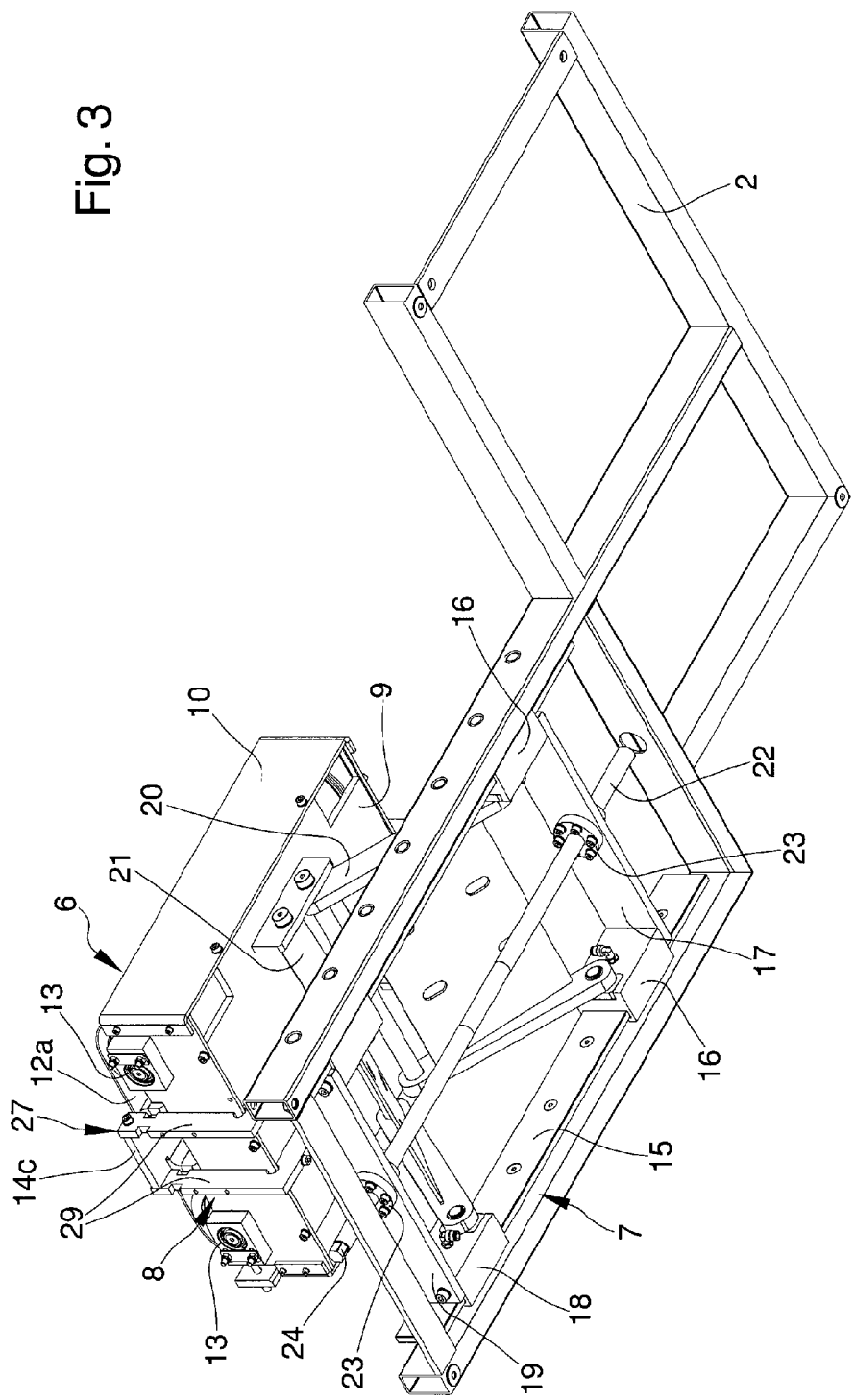
FIG. 3 is an axonometric view, from another angle, of the auxiliary detection appliance of FIG. 2.

In detail, the contrast element 14 is a plate having curved edges 14a which extend on the opposite side with respect to the active section 12a (as shown in FIG. 2) and which, avoiding sharp edges, permit reducing the wear of the belt 12 sliding on the plate.

The rolling device 6 is mobile along a direction of approaching and moving away D substantially at right angles and incident to the balancing axis A, so as to put the active section 12a of the flexible member 12 in contact with the wheel R.

In the particular embodiment shown in the illustrations, the balancing axis A is substantially horizontal while the direction of approaching and moving away D is substantially vertical.

The auxiliary detection appliance 6, 7, 8, furthermore, is arranged substantially below the balancing axis A with the active section 12a arranged in correspondence to the vertical lying plane of the balancing axis A.

In this embodiment, therefore, the active section 12a and the return section 12b are mainly arranged in horizontal position, with the active section 12a above the return section 12b.

In this respect, it is underlined that when, in the present treatise, an element is said to be positioned above or below another or arranged horizontally/vertically, then such relative positions must be considered with reference to the horizontal arrangement of the balancing axis A and vertical arrangement of the direction of approaching and moving away D; clearly in fact, alternative embodiments cannot be ruled out wherein, e.g., the direction of approaching and moving away D, though remaining at right angles to the balancing axis A, is not vertical, in which case the active section 12a and the return section 12b will be orientated obliquely or vertically.

For lifting/lowering the rolling device 6 the auxiliary detection appliance 6, 7, 8 comprises translation means 7 which allow moving the rolling device 6 along the direction of approaching and moving away D.

The translation means 7 comprise:
  guide means 15 along an operating direction F at right angles to the direction of approaching and moving away D. The guide means 15 are associated with the base frame 2;
  a first sliding body 16, 17 and a second sliding body 18, 19 sliding along the guide means 15;
  a first operating arm 20 and a second operating arm 21 hinged to the support structure 9, 10 and to the first sliding body 16, 17 and second sliding body 18, 19 respectively, the reciprocal approaching and moving away of the first sliding body 16, 17 and of the second sliding body 18, 19 along the operating direction F being suitable for moving the rolling device 6 along the direction of approaching and moving away D.

In the embodiment shown in the illustrations, the guide means 15 are defined by a pair of longitudinal rails and the operating direction F is horizontal and parallel to the balancing axis A.

The first sliding body 16, 17 is defined by a pair of first runners 16 engaged in a prismatic way along the longitudinal rails 15 and linked together by means of a first joining element 17.

The first operating arm 20 is hinged, on the one side, to the first runners 16 and, on the other side, to the bottom wall 9 of the support structure 9, 10.

In the same way, the second sliding body 18, 19 is defined by a pair of second runners 18 engaged in a prismatic way along the longitudinal rails 15 and linked together by means of a second joining element 19.

The second operating arm 21 is hinged, on the one side, to the second runners 18 and, on the other side, to the bottom wall 9 of the support structure 9, 10.

The kinematic mechanism consisting of the sliding bodies 16, 17, 18, 19 and operating arms 20, 21 is such as to allow the movement of the rolling device 6 without changing its inclination, so that it, and in particular the active section 12a, is approached/moved away with respect to the wheel R in a translation movement only.

Advantageously, the translation means 7 also comprise a worm-screw mechanism 22, 23 associated with the first sliding body 16, 17 and with the second sliding body 18, 19 for the adjustment of their reciprocal position.

The worm-screw mechanism 22, 23 consists, e.g., of a screw 22 which extends parallel with the operating direction F and engages two threaded blocks 23 associated with the first joining element 17 and with the second joining element 19 respectively.

The screwing up of the screw 22 permits approaching or moving away the sliding bodies 16, 17, 18, 19 from one another.

For this purpose one extremity of the screw 22 has a shape 24 designed to allow its manual rotation by means of a tool, a spanner or the like.

Alternatively, the shape 24 can be used for connecting to a motor-driven device 25 (an electric motor or the like) for the automated operation of the worm-screw mechanism 22, 23 in rotation around its axis; this motor-driven device 25 is shown in FIG. 2 by means of a broken line.

The particular solution of using a worm-screw mechanism 22, 23 to move the rolling device 6 makes it possible to provide the entire structure with considerable sturdiness and strength.

The worm-screw mechanism 22, 23, in fact, is an irreversible kinematic mechanism and once the required position has been reached, the sliding bodies 16, 17, 18, 19 are no longer able to move, unless the screw 22 is made to rotate again.

To further increase the stability and strength of the translation means 7 during the execution of the measurements, the sliding bodies 16, 17, 18, 19 can be equipped with a braking system which allows temporarily fixing them to the guide means 15.

Such braking system, e.g., could consist in a series of vices arranged inside the first runners 16 and/or the second runners 18.

During use, the translation means 7 permit placing the rolling device 6 in contact with the tread of the wheel R, whether this is a large size or small size wheel.

Figure 7:
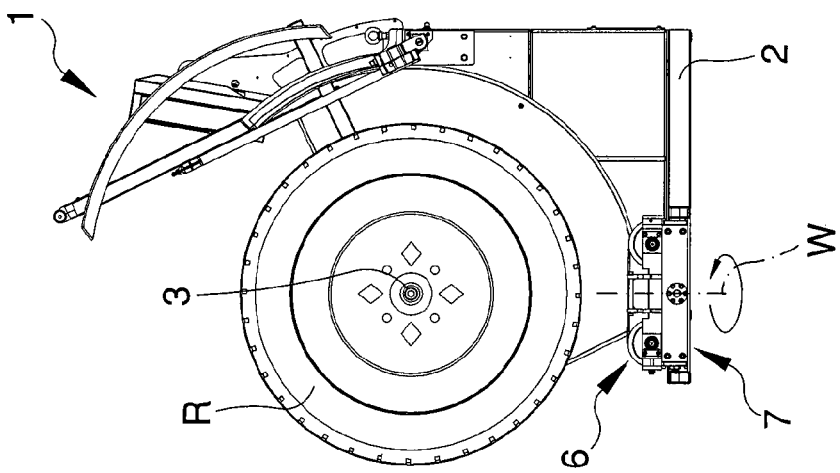

In FIG. 7, e.g., the machine 1 is shown with a large-size wheel R fitted on the gripping and rotation means 3 and the rolling device 6 completely lowered and not in contact with the wheel R.

Figure 8:
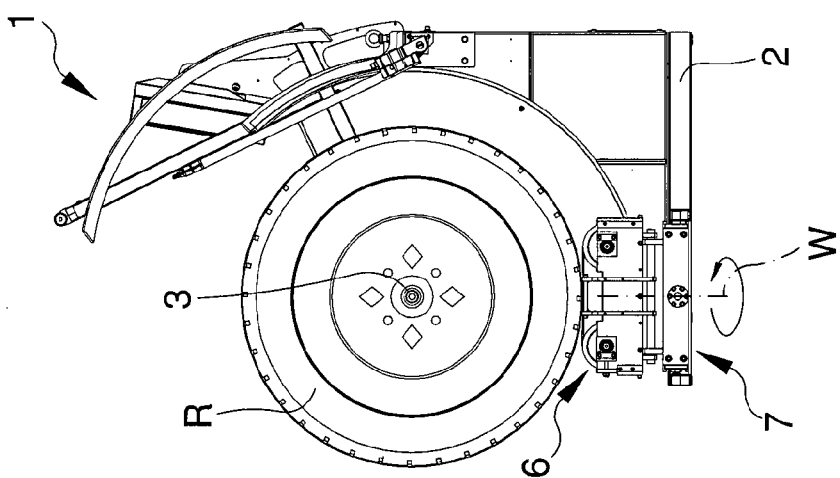

In FIG. 8, on the other hand, the machine 1 is shown with the same wheel R of FIG. 7 and the rolling device 6 lifted to press against the wheel R.

Figure 9:
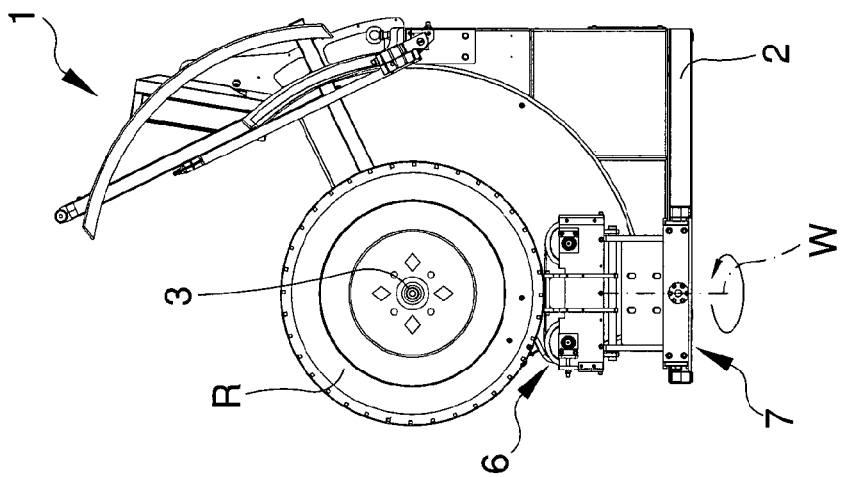

In FIG. 9, furthermore, the machine 1 is shown with a small-sized wheel R fitted on the gripping and rotation means 3 and the rolling device 6 lifted to press against the wheel R.

The auxiliary detection appliance 6, 7, 8 also comprises second sensor means 8 associated with the rolling device 6 and suitable for detecting the behaviour of the wheel R when this is pressed by the rolling device 6.

The second sensor means 8 are electronically linked to the electronic processing and control unit 5 which is able to combine the measurements detected by the first sensor means 4, by the second sensor means 8 and by any other detection systems on board the machine 1 to evaluate and predict the real behaviour on the road of the wheel R with great precision and reliability.

The second sensor means 8 comprise, in particular, a first sensor 26 suitable for detecting the reaction force of the wheel R oriented in a radial direction and a second sensor 27 suitable for detecting the reaction force of the wheel R oriented in a lateral direction.

In this respect, it is specified that by reaction force is meant the response effect induced on the rolling device 6 when the latter is pressed against the wheel.

The first sensor 26, in particular, measures the reaction oriented in a radial direction with respect to the wheel, i.e., at right angles to the balancing axis A.

The second sensor 27, instead, measures the reaction oriented in a lateral direction, i.e., parallel to the balancing axis A.

The second sensor means 8, in particular, are associated with the contrast element 14 and detect the behaviour of the wheel R according to the forces being discharged on it.

Usefully, the first sensor 26 and the second sensor 27 are uncoupled and independent from one another.

This last statement means that, due to the way the two sensors 26, 27 are arranged and designed, the measurement read by one sensor 26, 27 does not affect the measurement read by the other; in other words, the first sensor 26 is arranged and shaped to only read the radial reaction force component which discharges on the contrast element 14 while the second sensor 27 is arranged and shaped to only read the lateral reaction force component which discharges on the contrast element 14.

More in detail, the first sensor 26 comprises at least a first bracket 28 associated with the support structure 9, 10 and supporting a first portion 14a of the contrast element 14 arranged on one side of the lying plane of the wheel R.

The second sensor 27, on the other hand, comprises at least a second bracket 29 associated with the support structure 9, 10 and supporting a second portion 14b of the contrast element 14 arranged on the one side of the lying plane of the wheel R opposite with respect to the first portion 14a.

In other words, with reference to the lying plane of the wheel R, i.e., the vertical plane at right angles to the balancing axis A on which lies the wheel R, the contrast element 14 can be split into a first portion 14a and a second portion 14b arranged on opposite sides of the above-mentioned lying plane of the wheel R; the first portion 14a rests on the first sensor 26 while the second portion 14b rests on the second sensor 27.

More in detail, the first sensor 26 comprises two first brackets 28 substantially identical the one to the other while the second sensor 27 comprises two second brackets 29 substantially identical the one to the other.

Each first bracket 28 has a first weakened section 30 to which is associated at least a first strainmeter 31 suitable for calculating the radial reaction force, depending on the deformation of the first weakened section 30.

Each first weakened section 30 is defined by two first weakening cuts 32 arranged on opposite sides of the first brackets 28 and slightly staggered the one to the other, i.e., obtained at different heights.

The first weakened section 30 of each first bracket 28 is therefore substantially parallel to the rotation axes of the rollers 11 (i.e., it is horizontal) and the first strainmeter 31 is arranged so as to detect the bending of the first weakened section 30 around an axis Z substantially at right angles both to the rotation axes of the rollers 11 and to the direction of approaching and moving away D.

Preferably, in each first bracket 28 two first strainmeters 31 are provided inside the first weakening cuts 32 on opposite sides of the first weakened section 30.

Figure 5:
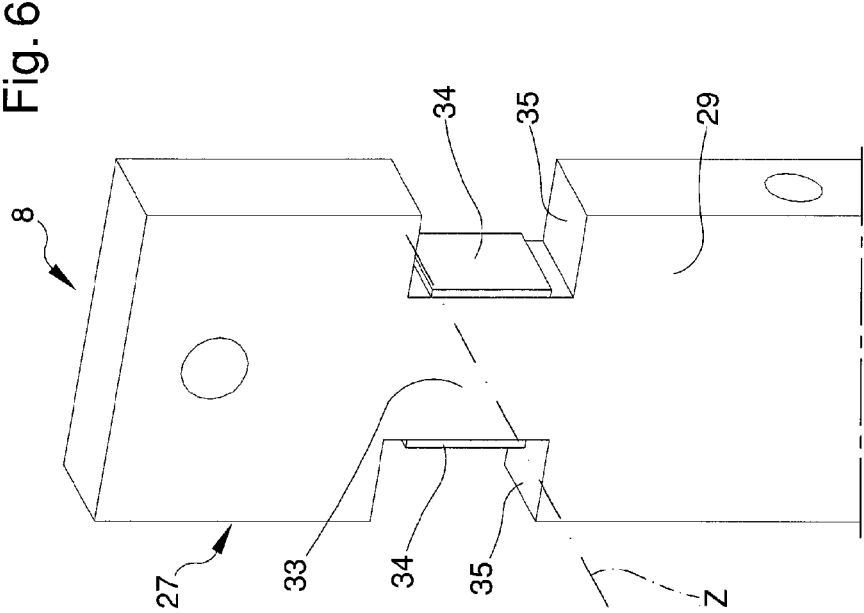
FIG. 5 is an axonometric view, on enlarged scale, of a detail of the auxiliary detection appliance of FIG. 2.

To improve the flexibility of the first weakened section 30, thus facilitating the measurement by the first strainmeters 31, the first weakened section 30 has a lightening hole 30a (FIG. 5).

In the same way, each second bracket 29 has a second weakened section 33 to which is associated at least a second strainmeter 34 suitable for calculating the lateral reaction force depending on the deformation of the second weakened section 33.

Each second weakened section 33 is defined by two second weakening cuts 35 arranged on opposite sides of the second brackets 29 and positioned at the same height.

The second weakened section 33 of each second bracket 29 substantially extends at right angles to the lying plane of the rotation axes of the rollers (i.e., vertically) and the second strainmeter 34 is arranged so as to detect the bending of the second weakened section 33 around an axis Z substantially at right angles to both the rotation axes of the rollers 11 and to the direction of approaching and moving away D.

Figure 6:
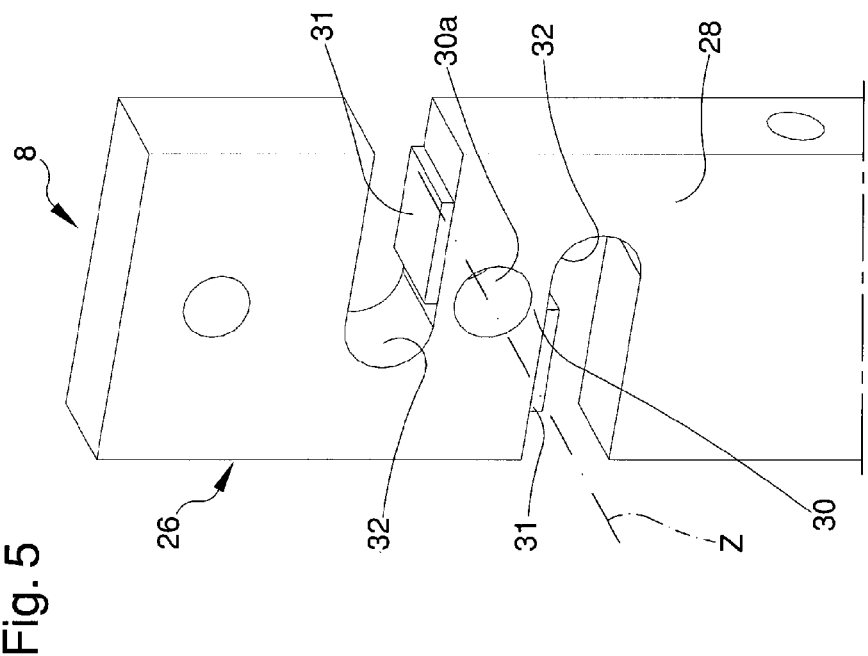
FIG. 6 is an axonometric view, on enlarged scale, of another detail of the auxiliary detection appliance of FIG. 2.

Preferably, in each second bracket 29, two second strainmeters 34 are provided arranged inside the second weakening cuts 35 on the opposite sides of the second weakened section 33 (FIG. 6).

In the embodiment of the present invention shown in the illustrations, the rotation axes of the rollers 11 never change their direction in space and remain horizontal and parallel with the balancing axis.

Alternative embodiments are nevertheless possible wherein the auxiliary detection appliance 6, 7, 8 comprises first inclination means suitable for inclining the active section 12a around an axis W which is at right angles to the lying plane of the rotation axes of the rollers 11 (shown in the FIGS. from 7 to 9).

The first inclination means made this way do in practice allow testing the behaviour of the wheel R under toe conditions different from zero, wherein the wheel R is made to roll on an active section 12a which moves forward along an oblique direction with respect to the lying plane of the wheel itself.

Figure 4:
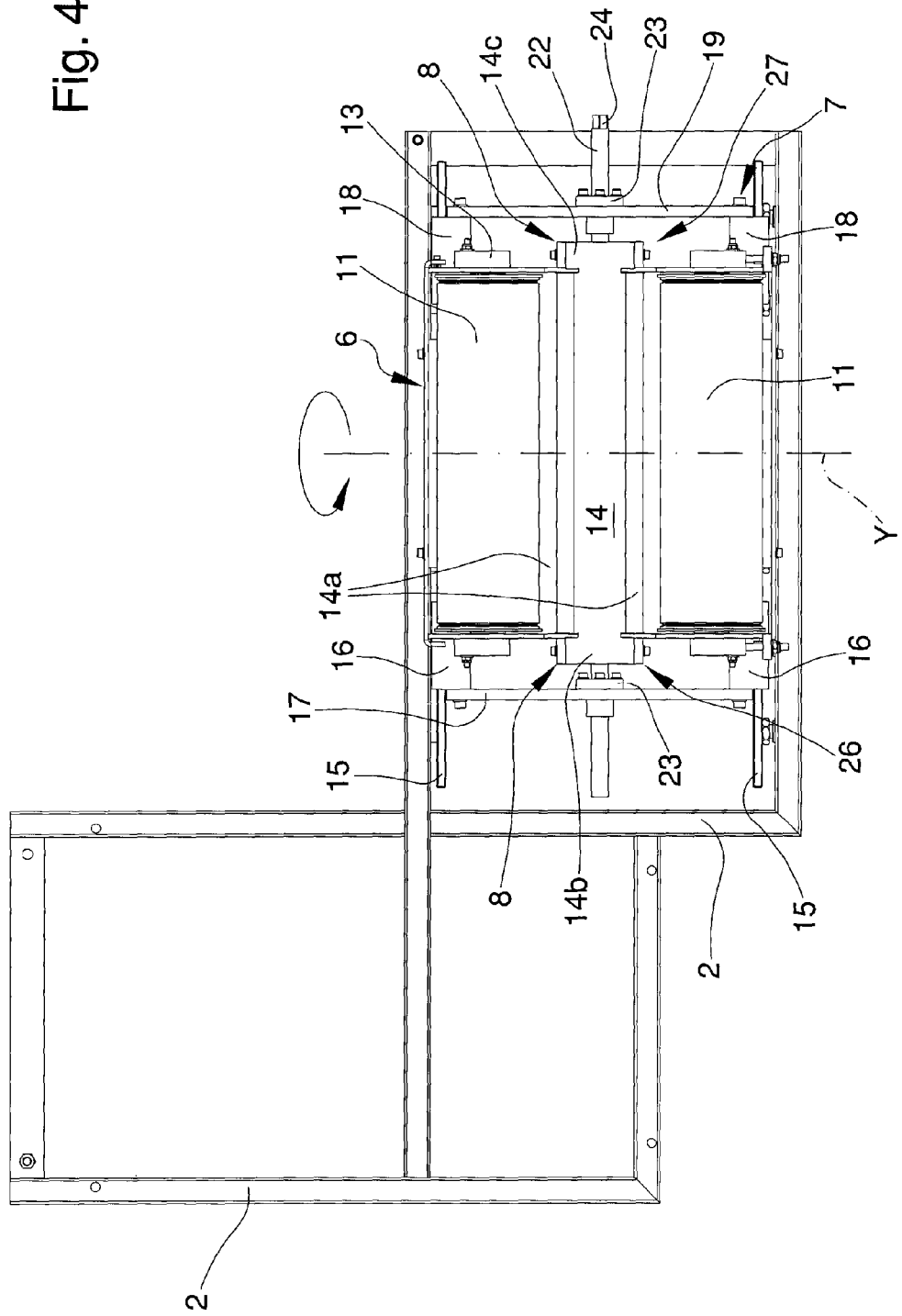
FIG. 4 is a plan view of the auxiliary detection appliance of FIG. 2 which, by ease of representation, does not feature any flexible belt.

In the same way, other embodiments are possible wherein the auxiliary detection appliance 6, 7, 8 comprises second inclination means suitable for inclining the active section 12a around an axis Y which is at right angles both to the rotation axes of the rollers 11 and to the direction of approaching and moving away D (visible in FIG. 4).

The second inclination means made this way in practice allow testing the behaviour of the wheel R in camber conditions different from zero in which the wheel R is made to roll on an active section 12a not at right angles to the lying plane of the wheel itself.

Usefully, the first and the second inclination means can be placed between the base frame 2 and the translation means 7 (e.g., between the base frame 2 and the guide means 15) so as to incline the entire auxiliary detection appliance 6, 7, 8.

Alternatively, the first and the second inclination means can be mounted at the base of the support structure 9, 10 (between the bottom wall 9 and the operating arms 20, 21), so as not to incline the entire auxiliary detection appliance 6, 7, 8 but only the rolling device 6.

By means of the machine 1, the balancing method can be implemented of the wheel R which comprises the following steps:
  turning the wheel R rotate around the balancing axis A;
  pressing the rolling device 6 onto the wheel R;
  detecting the behaviour of the wheel R during rolling on the rolling device 6 by means of the second sensor means 8.

Usefully, during the detection phase, the pressure applied by the rolling device 6 on the wheel R can be set at a preset value and kept constant.

For this purpose, it is enough to operate the worm-screw mechanism 22, 23 in rotation as far as a preset position.

The detection phase can if necessary be repeated by applying on the wheel a pressure of the rolling device 6 which is different than before, so as to test the wheel R in the event of its being fitted on a lightweight vehicle (motorcar type) or on a heavy vehicle (truck type), or to check the empty vehicle or full-load vehicle conditions.

In the event of the translation means 7 comprising the motor-driven device 25, then the detection phase can be performed by varying in real time the pressure applied by the rolling device 6 so as to test the wheel R by simulating on it any roughness in the road surface.

In the presence of the first inclination means and/or of the second inclination means, furthermore, the detection phase can occur under toe conditions different from zero and/or camber conditions different from zero.

The invention claimed is:

1. Balancing machine (1) for balancing vehicle wheels, comprising:
a base frame (2) supporting gripping and rotation means (3) for gripping and rotating a wheel (R) for vehicles around a balancing axis (A),
first sensor means (4) associated with said gripping and rotation means (3) suitable for detecting unbalance of said wheel (R),
at least an electronic processing and control unit (5) associated with said first sensor means (4) for the calculation of at least a balancing weight to apply onto said wheel (R) to balance said unbalance, and
at least an auxiliary detection appliance (6, 7, 8) associated with said base frame (2) and having:
at least a rolling device (6) suitable for pressing onto said wheel (R), and
second sensor means (8) associated with said rolling device (6) and suitable for detecting the behavior of said wheel (R) when pressed by said rolling device (6),
said rolling device (6) comprising:
a support structure (9, 10) for at least two rollers (11) revolving around axes parallel to each other, and
at least a flexible member (12) closed on itself in a loop, wrapped around said rollers (11) and having a substantially flat active section (12a), suitable for pressing on said wheel (R) to simulate the rolling thereof on a road, and a return section (12b) substantially opposite said active section (12a),
wherein:
said rolling device (6) comprises at least a substantially flat contrast element (14), associated with said support structure (9, 10) in correspondence to said active section (12a) and on which said active section (12a) is arranged in sliding contact,
said second sensor means (8) comprise at least a first sensor (26) suitable for detecting a radial reaction force of said wheel (R) oriented in a radial direction and at least a second sensor (27) suitable for detecting a lateral reaction force of said wheel (R) oriented in a lateral direction, and
said first sensor (26) comprises at least a first bracket (28) associated with said support structure (9, 10) and supporting a first portion (14b) of said contrast element (14) arranged on a side of the lying plane of said wheel (R) and said second sensor (27) comprises at least a second bracket (29) associated with said support structure (9, 10) and supporting a second portion (14c) of said contrast element (14) arranged on a side of the lying plane of said wheel (R) opposite with respect to said first portion (14b).

2. Machine (1) according to claim 1, wherein said flexible member (12) is belt-shaped.

3. Machine (1) according to the claim 2, wherein the belt-shaped flexible member (12) has a width, which is substantially bigger than that of the tread of said wheel (R).

4. Machine (1) according to claim 1, wherein said auxiliary detection appliance (6, 7, 8) comprises translation means (7) of said rolling device (6) along a direction of approaching and moving away (D) substantially at right angles and incident to said balancing axis (A).

5. Machine (1) according to the claim 4, wherein said balancing axis (A) is substantially horizontal and said direction of approaching and moving away (D) is substantially vertical.

6. Machine (1) according to the claim 5, wherein said auxiliary detection appliance (6, 7, 8) is arranged substantially below said balancing axis (A), with said active section (12a) arranged in correspondence to a vertical lying plane of said balancing axis (A).

7. Machine (1) according to claim 4, wherein said auxiliary detection appliance (6, 7, 8) comprises second inclination means suitable for inclining said active section (12a) around an axis at right angles to both the rotation axes of said rollers (11) and to said direction of approaching and moving away (D) to detect the behavior of said wheel (R) under camber conditions different from zero.

8. Machine (1) according to claim 1, wherein said first sensor (26) and said second sensor (27) are uncoupled and independent from one another.

9. Machine (1) according to claim 1, wherein said second bracket (29) comprises at least a second weakened section (33) with which is associated at least a second strainmeter (34) suitable for calculating said lateral reaction force depending on a deformation of said second weakened section (33).

10. Machine (1) according to claim 9, wherein:
said auxiliary detection appliance (6, 7, 8) comprises translation means (7) of said rolling device (6) along a direction of approaching and moving away (D) substantially at right angles and incident to said balancing axis (A);
said second weakened section (33) is substantially at right angles to the lying plane of the rotation axes of said rollers (11), and said second strainmeter (34) is arranged so as to detect bending of said second weakened section (33) around an axis (Z) substantially at right angles both to the rotation axes of said rollers (11) and to said direction of approaching and moving away (D).

11. Machine (1) according to claim 1, wherein said auxiliary detection appliance (6, 7, 8) comprises first inclination means suitable for inclining said active section (12a) around an axis at right angles to the lying plane of the rotation axes of said rollers (11) to detect the behavior of said wheel (R) under toe conditions different from zero.

12. Method for balancing vehicle wheels by means of the balancing machine (1) according to claim 1, wherein said method comprises the following steps:
turning said wheel (R) around said balancing axis (A);
pressing said rolling device (6) onto said wheel (R);
detecting the behavior of said wheel (R) rolling on said rolling device (6) by means of said second sensor means (8).

13. Method according to claim 12, wherein said method comprises keeping a pressure constant of said rolling device (6) on said wheel (R) during said detecting.

14. Method according to claim 12, wherein said method comprises varying a pressure of said rolling device (6) during said detecting.

15. Method according to claim 12, wherein said detecting occurs under toe conditions different from zero.

16. Method according to claim 12, wherein said detecting occurs under camber conditions different from zero.

17. Machine (1) according to claim 4, wherein said translation means (7) comprise guide means (15) along an operating direction (F) at right angles to said direction of approaching and moving away (D) associated with said base frame (2), at least a first sliding body (16, 17) and a second sliding body (18, 19) sliding along said guide means (15), and at least a first operating arm (20) and a second operating arm (21) hinged to said support structure (9, 10) and, respectively, to said first sliding body (16, 17) and to said second sliding body (18, 19), a reciprocal approaching and moving away of said first sliding body (16, 17) and of said second sliding body (18, 19) along said operating direction (F) being suitable for moving said rolling device (6) along said direction of approaching and moving away (D).

18. Machine (1) according to the claim 17, wherein said translation means (7) comprise at least a worm-screw mechanism (22, 23) associated with said first sliding body (16, 17) and with said second sliding body (18, 19) for an adjustment of their reciprocal position.

19. Machine (1) according to claim 1, wherein said first bracket (28) comprises at least a first weakened section (30) with which is associated at least a first strainmeter (31) suitable for calculating said radial reaction force depending on a deformation of said first weakened section (30).

20. Machine (1) according to claim 19, wherein:
said auxiliary detection appliance (6, 7, 8) comprises translation means (7) of said rolling device (6) along a direction of approaching and moving away (D) substantially at right angles and incident to said balancing axis (A);
said first weakened section (30) is substantially parallel to rotation axes of said rollers (11), and said first strainmeter (31) is arranged so as to detect bending of said first weakened section (30) around an axis (Z) substantially at right angles both to the rotation axes of said rollers (11) and to said direction of approaching and moving away (D).

* * * * *